(12) United States Patent
Lehmann et al.

(10) Patent No.: US 9,039,088 B2
(45) Date of Patent: May 26, 2015

(54) FITTING FOR A VEHICLE SEAT (75) Inventors: Ulrich Lehmann, Alfter (DE); Heinz Voss, Leverkusen (DE); Peter Thiel, Remscheid (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 184 days.

(21) Appl. No.: 13/696,038

(22) PCT Filed: Apr. 27, 2011

(86) PCT No.: PCT/EP2011/002113
§ 371 (c)(1),
(2), (4) Date: Dec. 27, 2012

(87) PCT Pub. No.: WO2011/137989
PCT Pub. Date: Nov. 10, 2011

(65) Prior Publication Data
US 2013/0234489 A1 Sep. 12, 2013

(30) Foreign Application Priority Data
May 5, 2010 (DE) .......................... 10 2010 019 697

(51) Int. Cl.
*B60N 2/12* (2006.01)
*B60N 2/20* (2006.01)
*B60N 2/225* (2006.01)
*B60N 2/235* (2006.01)

(52) U.S. Cl.
CPC ............... *B60N 2/2352* (2013.01); *B60N 2/12* (2013.01); *B60N 2/20* (2013.01); *B60N 2/2252* (2013.01)

(58) Field of Classification Search
USPC ............ 297/366, 367 R, 367 P, 368, 369, 370
See application file for complete search history.

(56) References Cited

U.S. PATENT DOCUMENTS 6,305,748 B1 * 10/2001 Ohba ............................ 297/362
6,619,743 B1    9/2003 Scholz et al.
6,799,806 B2   10/2004 Eppert et al.
(Continued)

FOREIGN PATENT DOCUMENTS

CN    1926007 A    3/2007
CN  101652266 A    2/2010
(Continued)

OTHER PUBLICATIONS

International Search Report dated Aug. 8, 2011 as received in corresponding PCT Application No. PCT/EP2011/002113.
(Continued)

*Primary Examiner* — David R Dunn
*Assistant Examiner* — Timothy J Brindley
(74) *Attorney, Agent, or Firm* — Foley & Lardner LLP (57) ABSTRACT

With a fitting for a vehicle seat, in particular for a motor vehicle seat, having a first fitting part and a second fitting part, which are rotatable relative to one another and are in geared connection with each other, an enclosing ring, which axially holds together the first fitting part and the second fitting part, forming a disc-shaped unit, and which is fixed to the first fitting part and engages over the second fitting part radially outside, and a third fitting part which is pivotably mounted relative to the first fitting part and which can be locked by means of a toothed pawl with a latching element which is provided on the first fitting part, the toothed latching element is formed on the first fitting part.

9 Claims, 6 Drawing Sheets

(56) References Cited

U.S. PATENT DOCUMENTS

| | | | |
|---|---|---|---|
| 7,461,900 B2* | 12/2008 | Lange | 297/367 R |
| 7,513,573 B2* | 4/2009 | Wahls et al. | 297/362 |
| 7,520,568 B2* | 4/2009 | Hoshihara et al. | 297/367 R |
| 7,571,962 B2 | 8/2009 | Thiel et al. | |
| 8,109,573 B2* | 2/2012 | Kienke et al. | 297/367 R |
| 8,313,145 B2* | 11/2012 | Flesch et al. | 297/362.11 |
| 2003/0214165 A1* | 11/2003 | Finner et al. | 297/326 |
| 2005/0179297 A1* | 8/2005 | Finner et al. | 297/362 |
| 2006/0290188 A1* | 12/2006 | Guillouet | 297/367 |
| 2007/0108824 A1* | 5/2007 | Lange | 297/367 |
| 2009/0008980 A1 | 1/2009 | Schmitz et al. | |
| 2012/0091776 A1* | 4/2012 | Kienke et al. | 297/367 R |
| 2012/0169104 A1* | 7/2012 | Stilleke et al. | 297/362 |
| 2012/0223562 A1* | 9/2012 | Assmann et al. | 297/362 |

FOREIGN PATENT DOCUMENTS

| | | |
|---|---|---|
| DE | 44 39 644 A1 | 6/1995 |
| DE | 195 48 809 C1 | 5/1997 |
| DE | 10 2006 044 489 A1 | 8/2007 |
| DE | 20 2008 005 523 U1 | 8/2008 |
| DE | 10 2008 017 019 A1 | 12/2008 |
| DE | 10 2010 019 697 A1 | 11/2011 |
| EP | 0 087 031 B1 | 2/2000 |
| WO | WO-2005/084996 A1 | 9/2005 |
| WO | WO-2009/065496 A2 | 5/2009 |

OTHER PUBLICATIONS

Office Action dated Jun. 4, 2014, in corresponding Chinese Application No. 201180022265.6 along with English translation, 15 pages.

* cited by examiner

FITTING FOR A VEHICLE SEAT

CROSS REFERENCE TO RELATED APPLICATIONS

The present application is a National Stage of International Application No. PCT/EP2011/002113 filed on Apr. 27, 2011, which claims the benefit of German Patent Application No. 10 2010 019 697.5 filed on May 5, 2010, the entire disclosures of which are incorporated herein by reference.

The invention relates to a fitting for a vehicle seat having the features of the preamble of claim 1.

A fitting of this type is known from U.S. Pat. No. 7,571,962 B2. The first fitting part and the second fitting part are in geared connection with each other in order to adjust the inclination of the backrest. The third fitting part is pivotably mounted on a bearing ring which is fixed to the first fitting part. Furthermore, a separately configured latching element is seated on the bearing ring and fixed thereto, so that it is fixedly connected with the first fitting part. A toothed pawl which is pivotably mounted on the third fitting part locks with the latching element which, for this purpose, is toothed as well in a radially protruding area. When the pawl is opened, the backrest is freely pivotable.

A similar fitting is known from DE 10 2008 017 019 A1. The first fitting part and the second fitting part are in geared connection with each other, in order to adjust the inclination of the backrest. The enclosing ring engages over the second fitting part and is fixedly connected with the first fitting part, wherein they jointly form a lug which represents a region which radially protrudes from the otherwise circular basic shape. A third fitting part is pivotably mounted relative to the first fitting part. A bolt-shaped stop which is provided on the third fitting part and a pre-stressed lock which is pivotably mounted on the third fitting part receive the lug between them, thus locking the third fitting part with the first fitting part. When the lock is opened, the backrest is freely pivotable.

The object of the invention is to improve a fitting of the type mentioned in the introduction. This object is achieved according to the invention by a fitting having the features of claim 1. Advantageous configurations are the subject-matter of the subordinate claims.

By the toothed latching element being formed on the first fitting part a component (separate latching element) is saved, i.e. weight and costs are reduced. This is favored by a preferably substantially flat shape of the enclosing ring which does no longer completely engage over the first fitting part, whereas, compared to the known L-shaped profiled configuration of the enclosing ring, also less material is required, leading to further savings in weight and costs. Compared to simple locks, a toothed pawl and a toothed latching element increase solidity of locking. For increasing solidity of the toothed lug further, the teeth thereof can be embossed, i.e. by non-cutting shaping, in such a way that the tooth spaces are configured in the axial direction at best partly, i.e. non-cut, and configured over the whole material thickness. The teeth are thus (unilaterally) connected with each other in the region of their tooth tips. The same applies to the latching element.

The formed-on latching element can be realized by an already existing portion of material or by an especially configured portion of material. The already existing counter-toothing on the reverse side of the toothed ring of an eccentric epicyclic gear system is ideally suitable for the first embodiment. This counter-toothing is automatically formed when embossing the toothed ring (on its reverse side), for which the corresponding regions of the first fitting part are transformed by non-cutting shaping.

The use of an eccentric epicyclic gear system enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric epicyclic gear system can be driven manually or by a motor.

The basic component of retaining of the eccentric epicyclic gear is provided by friction between the eccentric and one of the two fitting parts, preferably the second fitting part, which preferably has a collar for supporting the eccentric. The preferably provided wedge segments which define the eccentric serve for both, retaining and driving the rolling movement of toothed wheel and toothed ring. A preferably provided retaining element serves for locking the fitting under dynamic loads.

The configuration of the toothed ring on the first fitting part which receives the eccentric and the configuration of the toothed wheel on the second fitting part which supports the eccentric saves material and building space, by the fact that the toothed wheel can be configured on the radially outer edge of the second fitting part (which is then engaged over by an enclosing ring which is fixed to the first fitting part) and nevertheless there are sufficiently large connecting regions available on the second fitting part, for mounting the fitting.

The invention can be used preferably for longitudinally adjustable vehicle seats of two-door motor vehicles with centric free-pivoting of the backrest, but it can also used for other vehicle seats.

The invention is explained in more detail hereinafter with reference to an exemplary embodiment shown in the drawing, in which.

Figure 6:
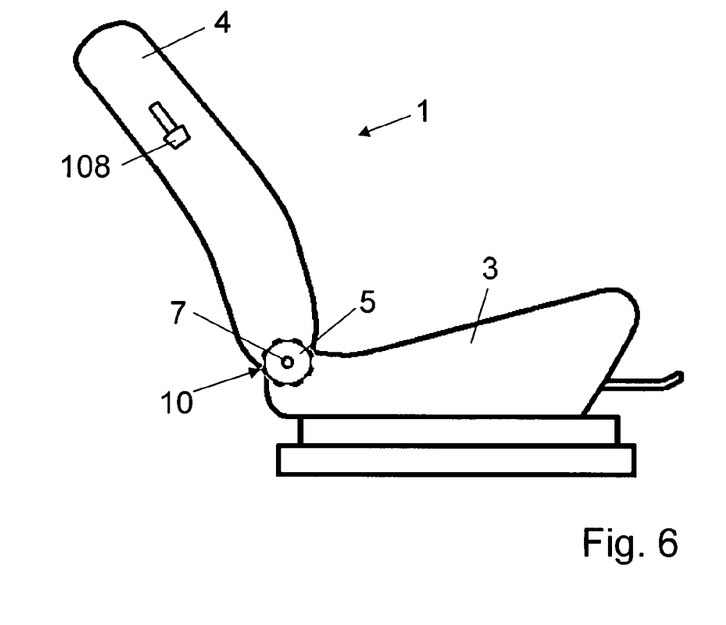
FIG. 6 shows a schematic representation of a vehicle seat.

A vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure. The drive shaft 7 defines the adopted directional data of a cylinder coordinate system.

The fitting 10 has a first fitting part 11 and a second fitting part 12 which can be rotated relative to one another. Each of the two fitting parts 11 and 12 can be approximately inscribed in a circular disc shape. In order to absorb the axially acting forces, i.e. in order to hold the fitting parts 11 and 12 axially together, an enclosing ring 13 is provided. Such a method of holding parts together by means of an enclosing ring is described, for example, in U.S. Pat. No. 6,799,806 A. The enclosing ring 13 which is preferably composed of metal is fixedly connected, for example welded or bent over (at least partly in the circumferential direction) with one of the two fitting parts 11 and 12, in the present case with the first fitting part 11 in an outer end section. By means of an end section which is facing radially inward, the enclosing ring 13 engages over the other one of the two fitting parts 11 and 12, which is movable relative to it, radially outside, optionally with the interposition of a separate sliding ring, without impeding the relative rotation of the two fitting parts 11 and 12, i.e. the enclosing ring 13 and the fitting part 11 or 12 which is fixedly connected with it, enclose the other one of the two fitting parts 11 and 12 which is movable relative to it. From a structural point of view, the two fitting parts 11 and 12 together (with the enclosing ring 13) consequently form a disc-shaped unit.

With the mounting of the fitting 10, the first fitting part 11 is connected tightly to the backrest 4. The second fitting part 12 is then connected tightly with the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be connected with the backrest 4. The fitting 10 consequently is in the force flow between the backrest 4 and the seat part 3, this is why the two fitting parts 11 and 12 are composed of metal, preferably of steel.

The fitting 10 is in the form of a gear fitting in which a first fitting part 11 and a second fitting part 12 are connected to each other by means of a gear unit for adjustment and fixing in position, to be more precise, by means of an eccentric epicyclic gear system, which in the present case is self-locking as described, for example, in DE 44 36 111 A1.

In order to form the gear unit, an externally toothed toothed wheel 16 is formed on the second fitting part 12, and an internally toothed toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring on the toothed wheel. The toothed wheel 16 and the toothed ring 17 are formed preferably by means of one single stamping process which simultaneously punches the fitting parts 11 and 12 from their initial material. Alternatively, the fitting parts 11 and 12 can be manufactured—with similar geometries and same functions—by massive forming (preferably cold-impact extrusion or hot extrusion). In the present case, the toothed wheel 16 forms the radially outer edge of the second fitting part 12, i.e. radially outward the second fitting part 12 is flush with the toothed wheel 16.

One of the two fitting parts 11 and 12, has a collar 19, in the present case the second fitting part 12, concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disc 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disc 25 and the hub 22. The mutually facing broad sides of the wedge segments 27 each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along a part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disc 25, such sealing ring being composed for example of rubber or of soft plastics material and being connected with, in particular clipped to, the covering disc 25.

The wedge segments 27 (and the spring 35) define an eccentric which, in the extension of the direction of eccentricity, presses the toothed wheel 16 into the toothed ring 17 at an engagement site. When drive is effected by means of the drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

To improve the dynamic operating characteristics, a retaining spring 51 as has been disclosed, for example in DE 195 48 809 C1, is preferably additionally provided as retaining element. The retaining spring 51 in the present case cooperates with a toothing which is configured as a further toothed ring on the first fitting part 11. The retaining spring 51 retains the wedge segments 27 in the non-driven state of the fitting 10, (by the retaining spring 51 retaining the spring 35 by bearing against the end fingers 35a) and is released by the driven driver 21.

In addition to said disc-shaped unit and to the components contained therein, each fitting 10 also contains a free-pivoting device. On the first fitting part 11, a third fitting part 74 is supported on its side which faces away from the second fitting part 11, for example by means of a bearing ring 71 which is fixed to the first fitting part. The plate-like third fitting part 74 is connected with the backrest structure of the backrest 4 ("fixed with respect to the backrest") and pivotable about a central axis A (which is defined by the bearing ring 71), for a centrically effected free-pivoting relative to the first fitting part 11. During the use of the vehicle seat 1, the third fitting part 74 is locked with the first fitting part 11, and more precisely with a latching element 75 which is provided on the first fitting part 11. A stop 79 on the first fitting part 11 is effective for limiting the pivoting movement of the third fitting part 74 in the backward-pivoting direction of the backrest 2 (in FIGS. 1, 2, 3 and 6 anti-clockwise), i.e., in the normal case, for the re-establishment of the use position of backrest 4 after free-pivoting is finished, and also preferably in the event of a rear-end crash. Free-pivoting which serves for an easier access to the next seat row, at the same time can be a transition into a table position with an approximately horizontal backrest 4, improving loading possibilities.

A pawl 80 is pivotably mounted on the third fitting part 74 on the side facing the first fitting part 11 (and the latching element 75), by means of a bearing pin 82. For locking the third fitting part 74, the toothed pawl 80 engages with the latching element 75 which is toothed as well. The bearing pin 82 is configured preferably as an eccentric pin, i.e. it is rotatably mounted relative to the third fitting part 74, about an axis which is offset with respect to the pivot axis of the pawl 80 in the third fitting part 74. For compensating the manufacturing tolerances, the bearing pin 82 is adjusted and fixed so that the pawl 80 engages with the latching element 75 with maximum pawl engagement. A counter-stop 84 cooperates with the stop 79 on the third fitting part 74. As a counter-stop 84, a pin is preferably provided, which can be configured alternatively or cumulatively to the bearing pin 82 as an eccentric pin. An axle stub 87, by means of which a securing element 91 is rotatably mounted relative to the third fitting part 74, is arranged in the third fitting part 74 in parallel to the bearing pin 82, for example by means of a bearing bush. The securing element 91 is pre-biased by means of a retaining spring 95 in the direction of the pawl 80, in order to secure its cooperation with the latching element 75. An unlocking pin 95, which extends parallel to the axle stub 87 through an opening in the third fitting part 74 and is thus accessible from outside, protrudes from the securing element 91. A cover 98 which is fixed to the third fitting part 74 covers the pre-named components of the free-pivoting device—at least partly—and protects them from contamination.

A movement of the unlocking pin 95, which is in operative connection with a hand lever 108 at the backrest 4, for example by means of a lever and of a control cable, pivots the securing element 91 open. By means of the pivoting movement, the securing element 91 releases the pawl 80. Preferably, when doing so, the securing element 91 gets to bear against an unlocking finger of the pawl 80 and thus pulls the pawl 80 open and/or supports it when opening. The pawl 80 is thus completely opened, and the third fitting part 74 is unlocked. The backrest 80 can be freely pivoted. Free-pivoting is limited in the forward-pivoting direction of the backrest 4 (in FIGS. 1, 2, 3 and 6 in clockwise sense) preferably by a stop which is fixedly connected with the second fitting part 12, such catch stop being received, for example, between two limit stops of the third fitting part 74. The stop can limit also the adjusting range for inclination adjustment, i.e. the relative rotation of the first fitting part 11 and the second fitting part 12.

Figure 5:
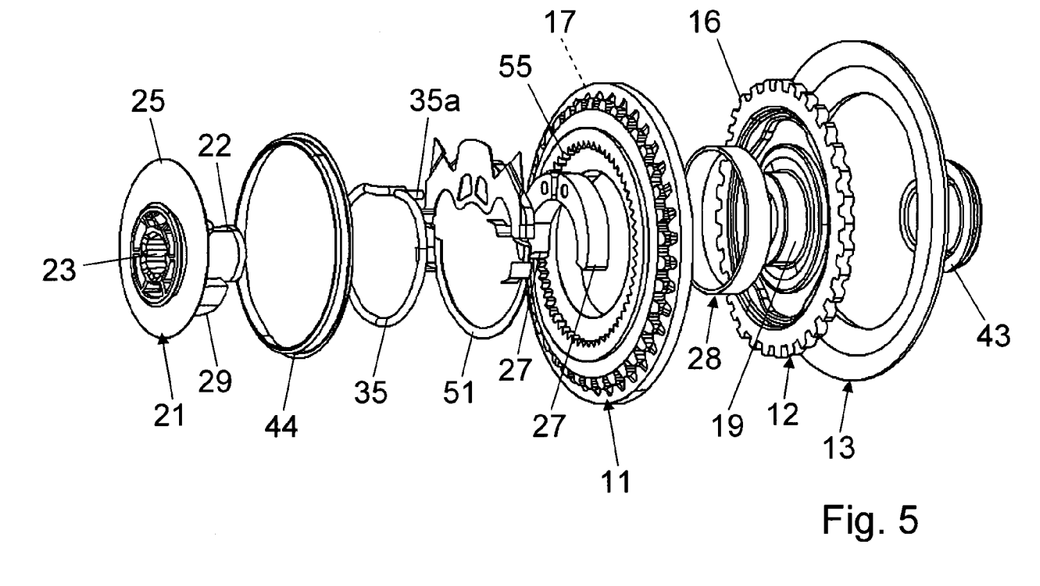
FIG. 5 shows an exploded view of the disc-shaped unit of the fitting with the components contained therein.

According to the invention, the latching element 75 is formed on the first fitting part 11, i.e. it forms a one-piece component of the latter as a material unity and is not a separately manufactured, subsequently fixed component. Preferably, the stop 79, too, is formed on the first fitting part 11 (or on the enclosing ring 13 or on the bearing ring 71). The solution according to the invention is favored by an enclosing ring having a substantially flat shape, as shown in FIG. 5, which engages over the first fitting part 11 at best partly and thus makes possible material portions which protrude radially also from the edge of the first fitting part 11. Different embodiments are possible for the latching element 75.

In a first exemplary embodiment (FIGS. 1, 2) the counter-toothing of the embossed toothed ring 17 on its reverse side serves as latching element 75. Correspondingly, the pawl 80 has suitable teeth. A separate component which is fixed to the first fitting part 11, for example in the present case is put in a form-fitting manner to the counter toothing of the toothed ring 17 and welded to the first fitting part 11, or a formed-on material portion which radially protrudes form the first fitting part 11 (or from the enclosing ring 13 or from the bearing ring 71), serves as a stop 79. In the forward-pivoting direction of the backrest 4, adjacent to the region of the counter-toothing of the toothed ring 17 which serves as latching element 75, optionally a filling piece 117 is provided which extends in the circumferential direction over a section of the counter-toothing of the toothed ring 17. The filling piece 117 closes in this section the teeth of the counter-toothing of the toothed ring 17, by engaging between then, thus preventing a locking of the pawl 80 with the counter-toothing of the toothed ring 17 during the transition into the free-pivoted position. The filling piece 117 preferably is made of plastic material and preferably clipped on the first fitting part 11, or it is a welded-on metal part. The pawl 80 on principle can engage again in the counter-toothing of the toothed ring 17, in the circumferential direction behind the filling piece 117, so that a securing of the free-pivoted position can be generated.

In a second exemplary embodiment (FIG. 3), the latching element 75 is formed on the first fitting part 11 radially outside, i.e. as a radially protruding material portion, wherein a toothing which cooperates with the pawl 80 is configured in this material portion. In the same way, the stop 79 is formed on the first fitting part radially outside, in the present case as a radially protruding material portion. The radial dimension of said material portions, by which they protrude with respect to the basic shape of the first fitting part 11, is smaller compared to the diameter of the first fitting part 11, so that the first fitting part 11 and the second fitting part 12 still together (with the enclosing ring 13) form a disc-shaped unit.

Figure 1:
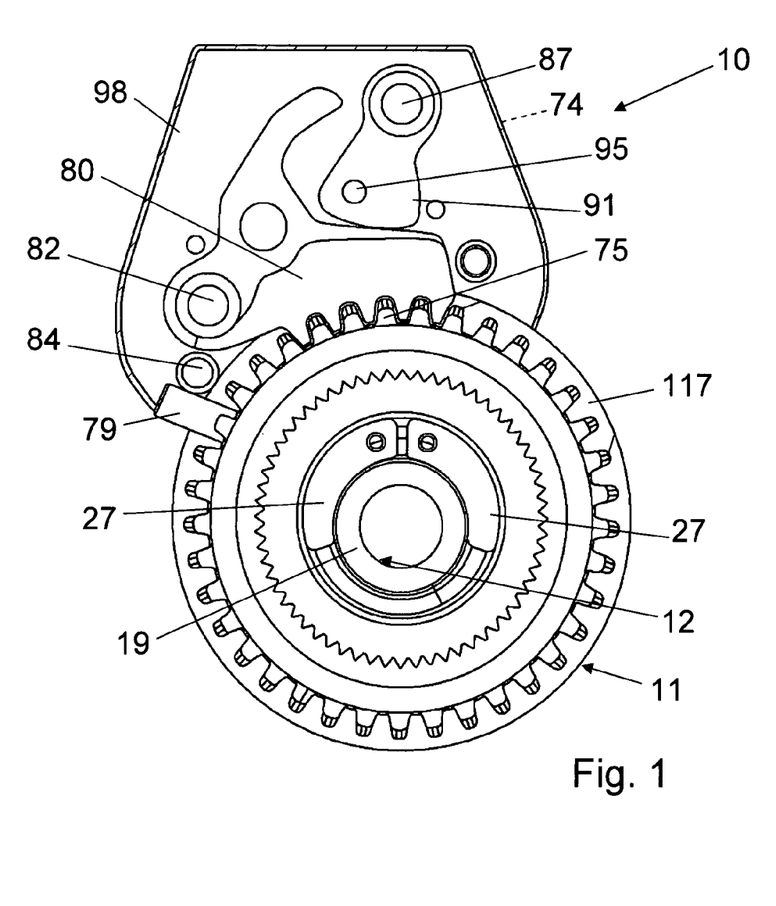
FIG. 1 shows a section through a fitting according to the first exemplary embodiment without springs and driver.
Figure 2:
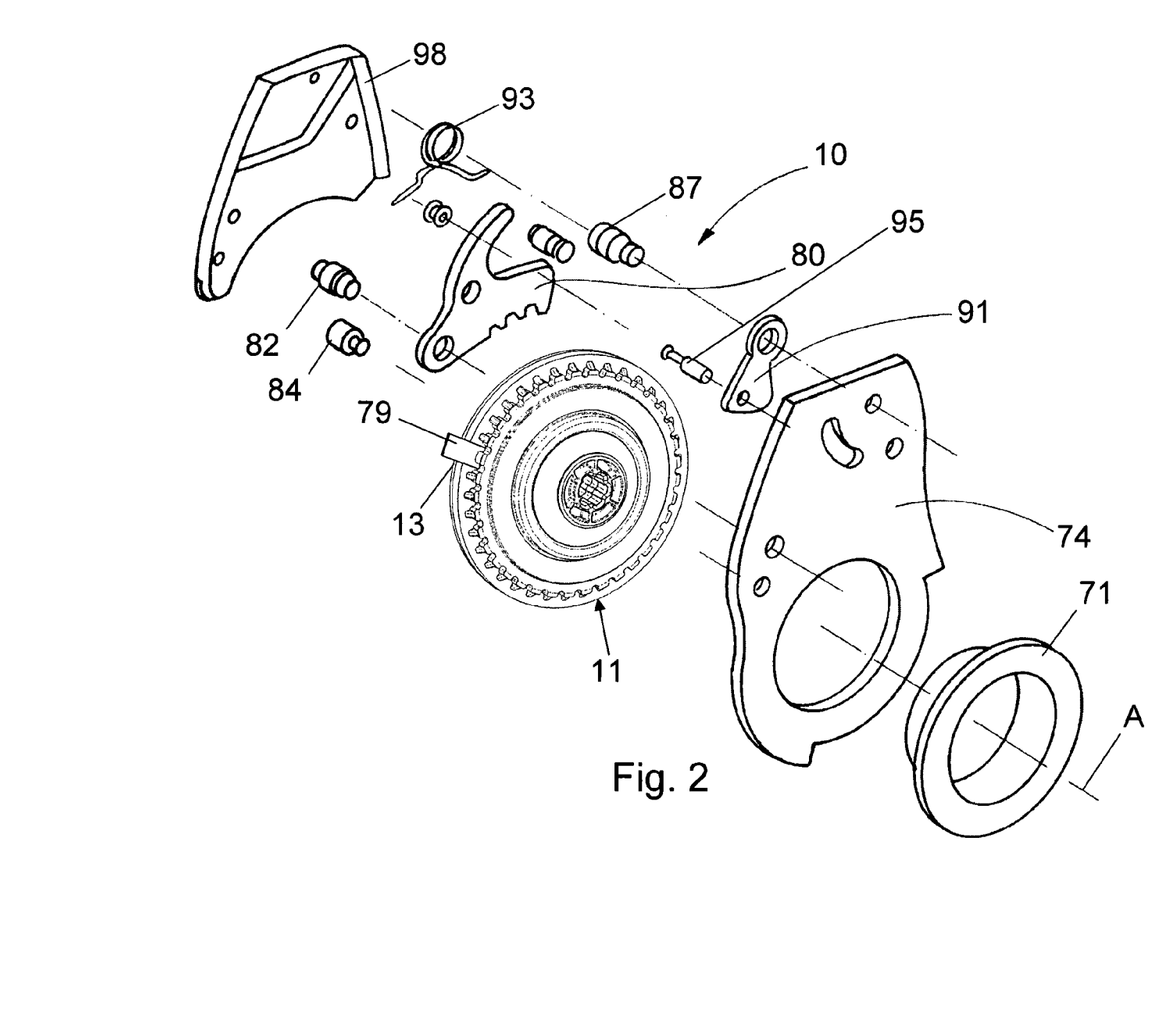
FIG. 2 shows an exploded view of the fitting of FIG. 1.
Figure 3:
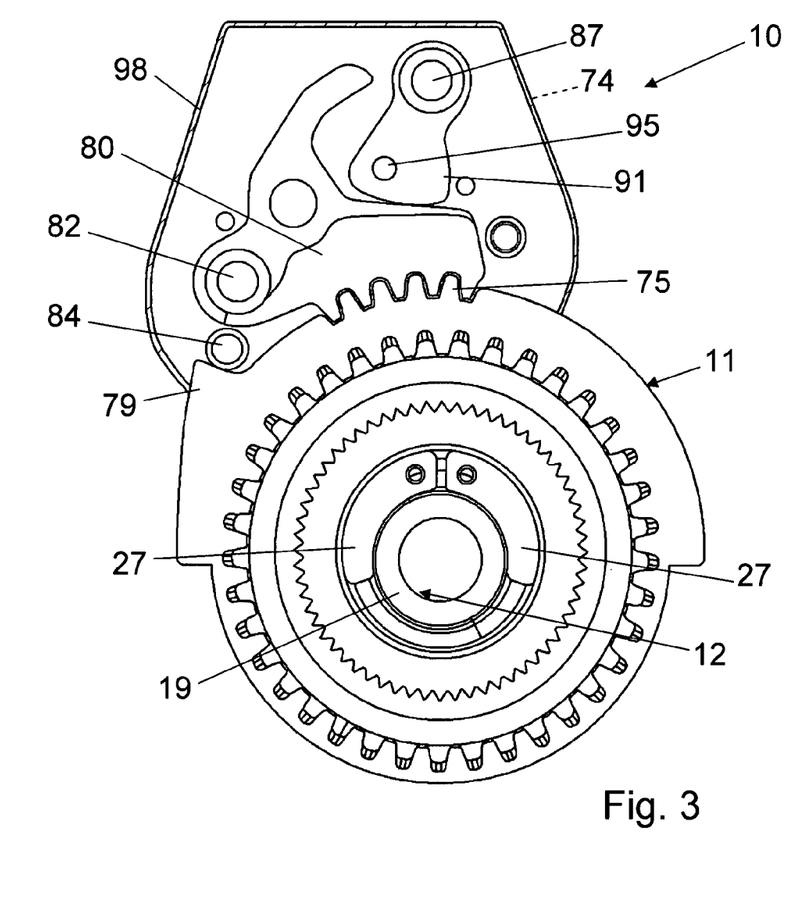
FIG. 3 shows a section through the fitting according to the second exemplary embodiment without springs and driver.
Figure 4:
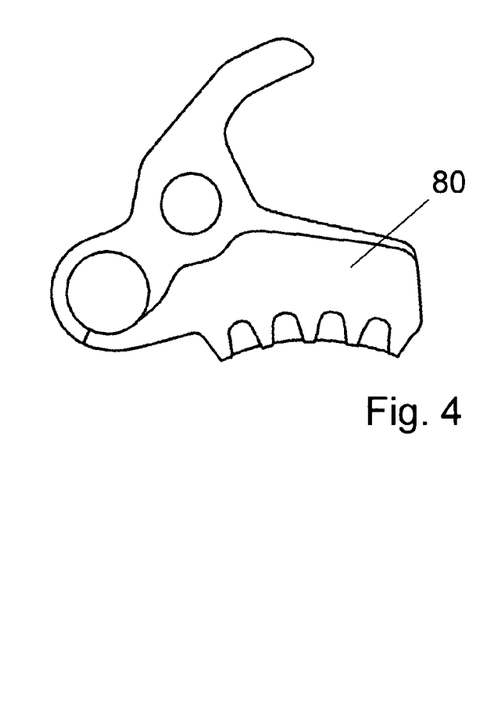
FIG. 4 shows a view of a modified pawl.

Further modifications of the two exemplary embodiments are possible. The axle stub 87 and the unlocking pin 95 for example can be flush with each other and be configured in one piece as a shaft which is rotatably supported in the third fitting part 74, as described for example in DE 10 2006 044 489 A1 the relevant disclosure of which is expressly incorporated herein. In a further modification, instead of a single securing element 91, also a catch element for supporting the pawl in the event of a crash and a clamping element for securing the pawl in the normal case can be provided, as they are described as well in said DE 10 2006 044 489 A1 or in DE 44 39 644 A1, the relevant disclosure of which is expressly incorporated herein. In a modification (FIG. 4), the teeth of the pawl 80 can be embossed (protruding), i.e. be configured by non-cutting forming (as with the toothed ring 17) on the side of the pawl 80 which faces the latching element 75. This increases solidity of the pawl 80 and permits smaller teeth widths. In a modified embodiment, the pawl 80 can have one single tooth which protrudes for example tangentially to the bearing pin 82, from the pawl 80. The latching element 75, too, can have one single tooth or one single tooth space. The stop 79 and the counter-stop 84, in a further modification, can be configured as (pairs of) stop cams, as described, for example, in DE 10 2008 029 438 A1, the relevant disclosure of which is expressly incorporated herein.

Figure 7:
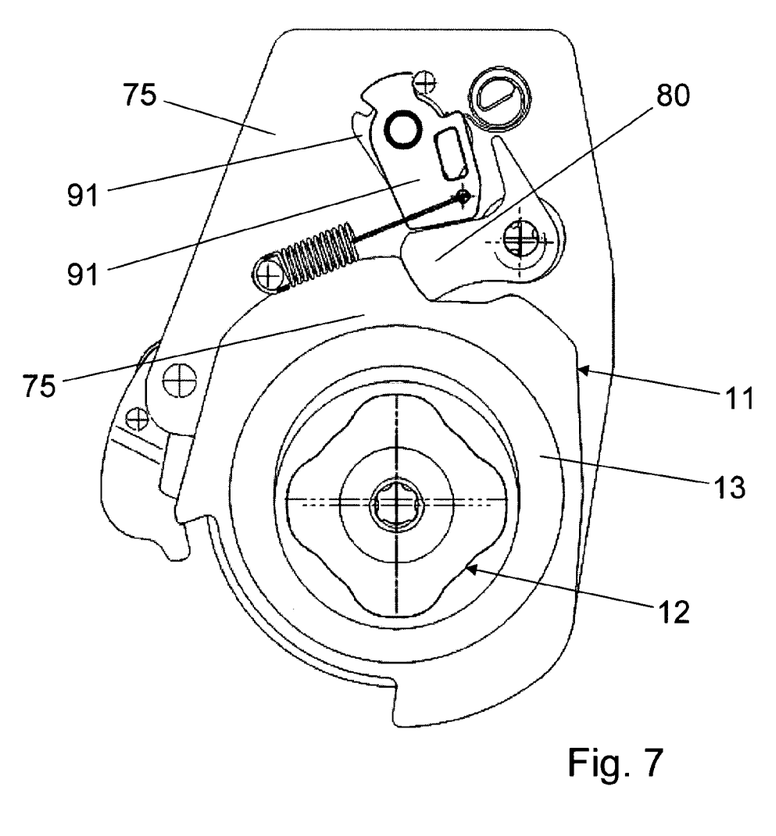
FIG. 7 shows a modification of the second exemplary embodiment.

FIG. 7 shows one of these modifications, and more precisely of the second exemplary embodiment. A flat enclosing ring 13 is fixed to the first fitting part 11, such enclosing ring engaging over the second fitting part 12. The third fitting part 74 is pivotably mounted on the first fitting part 11, in the present case by means of the bearing ring 71. The latching element 75 which is formed on the first fitting part 11 is defined by a radially protruding material portion of the first fitting part 11 and has one single tooth space. The pawl 80 which is pivotably mounted on the third fitting part 74 has one single tooth, which bears against a flank of the (asymmetric) tooth space, in order to lock the third fitting part 74. The pawl 80 is thereby secured by two securing elements 91, namely by one catching element for supporting the pawl 80 in the event of a crash and a clamping element for securing the pawl in the standard case. A similar free-pivoting device, but with a separately configured latching element 75 is described, for example, in DE 20 2008 011 680 U1 or in DE 10 2009 056 154 A1, the relevant disclosure of which is expressly incorporated herein.

LIST OF REFERENCE NUMERALS 1 vehicle seat
3 seat part
4 backrest
5 handwheel
7 drive shaft
10 fitting
11 first fitting part
12 second fitting part
13 enclosing ring
16 toothed wheel
17 toothed ring
19 collar
21 driver
22 hub
23 bore
25 covering disc
27 wedge segment
28 slide bearing bush
29 driver segment
35 spring
35a end finger
43 securing ring
44 sealing ring
51 retaining spring
55 toothing
71 bearing ring
74 third fitting part
75 latching element
79 stop
80 pawl
82 bearing pin
84 counter-stop
87 axle stub
91 securing element
93 securing spring
95 unlocking pin
98 cover
108 hand lever
117 filling piece
A axis

The invention claimed is:

1. A fitting for a vehicle seat, comprising:
a first fitting part;
a second fitting part,
wherein the first fitting part and the second fitting part are rotatable relative to one another and are in geared connection with each other;
an enclosing ring, which axially holds together the first fitting part and the second fitting part,
wherein the first fitting part, the second fitting part, and the enclosing ring are a disc-shaped unit,
wherein the enclosing ring is fixed to the first fitting part and engages over the second fitting part radially outside; and
a third fitting part pivotably mounted relative to the first fitting part,
wherein the third fitting part is locked relative to the first fitting part when a toothed pawl and a toothed latching element are engaged,
wherein the toothed latching element is provided on the first fitting part,
wherein the toothed latching element is formed on the first fitting part,
wherein the first fitting part and the second fitting part are in geared connection with each other via a toothed ring which is configured on the first fitting part, and a toothed wheel which is configured on the second fitting part, such toothed ring and toothed wheel meshing with each other, and
wherein the toothed latching element is an embossed region on a first side of the first fitting part,
wherein the toothed ring is on a second side of the first fitting part,
wherein the toothed latching element has counter-toothing relative to the toothed ring such that each top land of the toothed latching element is located at a same rotational position as a corresponding bottom land of the toothed ring.

2. A fitting according to claim 1, wherein a rotating eccentric which is driven by a driver is provided for driving a relative rolling movement of the toothed wheel and the toothed ring, wherein the eccentric is defined in particular by two wedge segments which are acted upon by a spring.

3. A fitting according to claim 2, wherein the first fitting part receives the eccentric via a slide bearing bush which is concentric to the toothed ring, and the second fitting part supports the eccentric via a collar which is concentric to the toothed wheel.

4. A fitting according to claim 1, wherein, in the circumferential direction, a filling piece is provided over a section of the counter-toothing of the toothed ring, such filling piece preventing a locking of the pawl.

5. A fitting according to claim 1, wherein the latching element is formed on the first fitting part radially outside, as a radially protruding material portion.

6. A fitting according to claim 1, wherein the teeth of the pawl are embossed.

7. A fitting according to claim 1, wherein at least one stop is formed on or fixed to the first fitting part, such stop cooperating with at least one counter-stop on the third fitting part, in order to limit the pivoting movement of the third fitting part in one pivoting direction.

8. A fitting according to claim 1, wherein the enclosing ring has a substantially flat shape.

9. A vehicle seat, having at least one fitting according to claim 1, a seat part which is connected with the second fitting part, and a backrest which is connected with the third fitting part.

* * * * *